Feb. 6, 1923.
J. H. RAND
CONVEYER APPARATUS
Filed Jan. 18, 1922
1,444,359
2 SHEETS-SHEET 1
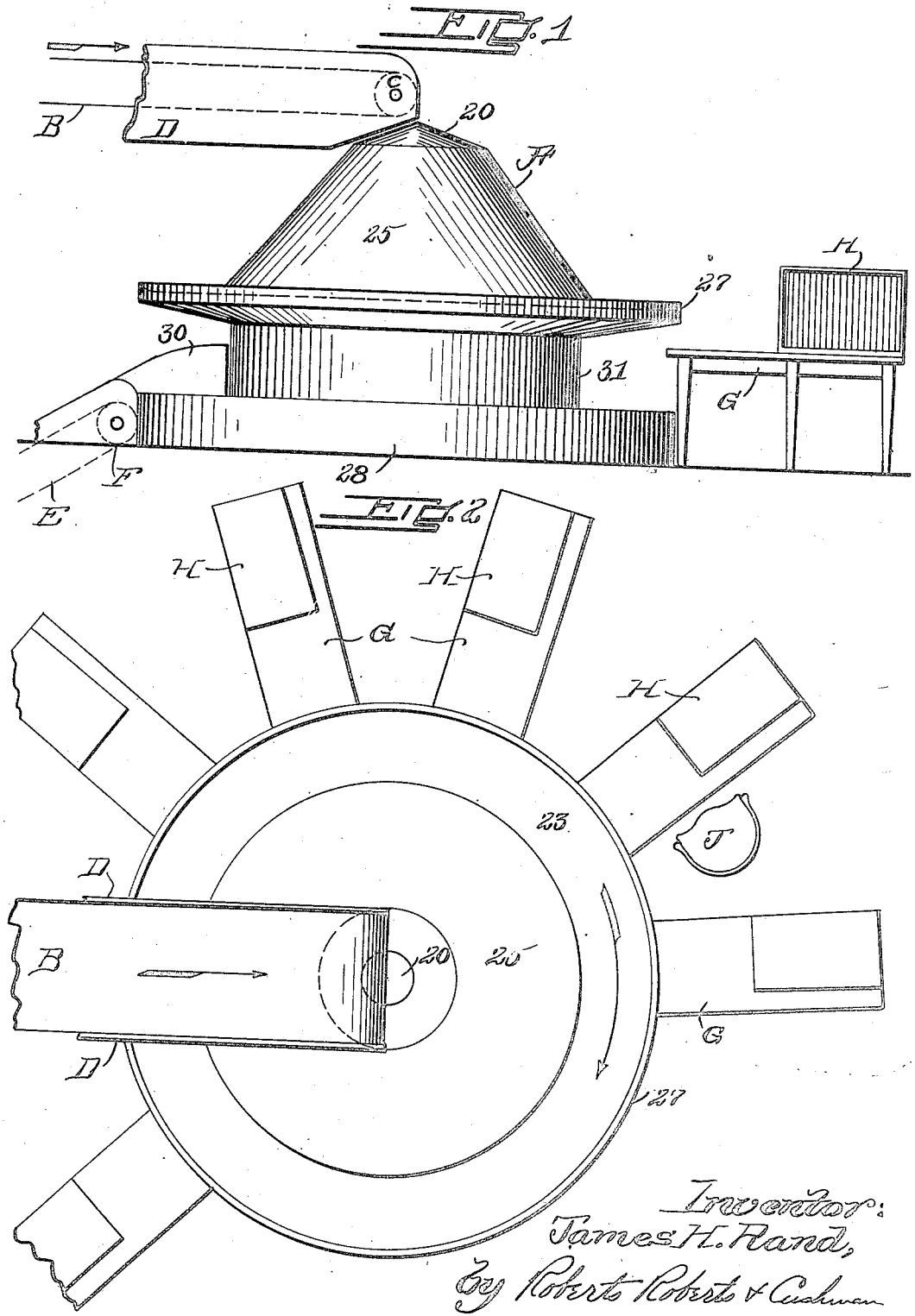

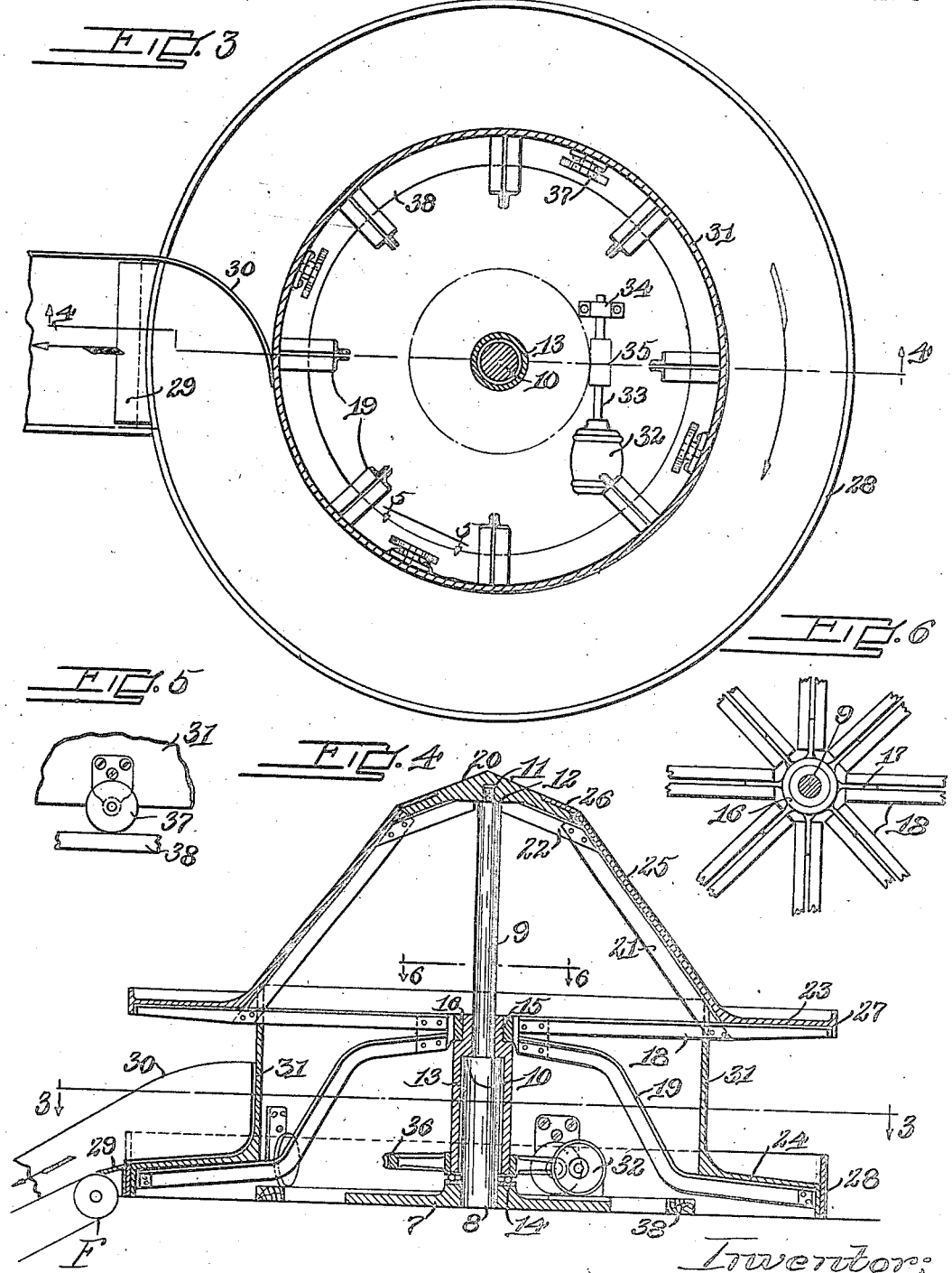

Patented Feb. 6, 1923.

1,444,359

UNITED STATES PATENT OFFICE.

JAMES H. RAND, OF NORTH TONAWANDA, NEW YORK.

CONVEYER APPARATUS.

Application filed January 18, 1922. Serial No. 530,095.

*To all whom it may concern:*

Be it known that I, JAMES H. RAND, a citizen of the United States, and resident of North Tonawanda, in the county of Niagara and State of New York, have invented new and useful Improvements in Conveyer Apparatus, of which the following is a specification.

This invention relates particularly to conveyer apparatus for use in department stores and the like where all charged merchandise passes through a checking department for the purpose of verifying the customers' credit before delivery, the apparatus serving to convey the articles to and from the checking operators, it being understood that the invention is useful for other purposes.

Objects of the invention are to deliver articles to and from any one of a plurality of stations with dispatch and orderliness, to reduce the number of operators in proportion to a reduced number of articles to be handled, to reduce the amount of space required for installations of the type referred to, to increase the speed and to reduce the cost of handling articles, and in general to simplify and improve apparatus of the character aforesaid.

The invention comprises a plurality of carriers traveling past a plurality of operators' stations, together with means for automatically depositing articles upon one of the carriers and means for automatically removing articles from another of the carriers so that the articles may be delivered to and from any one of the operators' stations by the same carriers. The carriers are preferably annular and rotatable about a common axis. A distributor is arranged to distribute articles to one of the carriers, the distributor having a surface sloping upwardly and inwardly from the carrier so that articles deposited thereupon slide to different positions on the carrier depending upon the angular position of the carrier.

More particularly the invention comprises a rotatable structure or support, such as a circular turntable, having vertically spaced, independent receiving surfaces or shelves. Means are provided for delivering articles to certain of the surfaces and for removing the inspected articles from another. In order to deliver the articles within easy reach of the operators who are grouped about the structure distributing means are preferably provided to direct the articles to the outer edge of receiving surface.

As an example typical of the genus to which the invention belongs an installation of apparatus for providing a final check upon packages about to be sent out to charge customers of a large department store will be shown and described.

In the drawings.—

Fig. 1 is an elevational view of the apparatus;

Fig. 2 is a plan view;

Fig. 3 is a horizontal section on the line 3—3 of Fig. 4;

Fig. 4 is a vertical section on the line 4—4 of Fig. 3;

Fig. 5 is a detailed view of a portion of the device indicated by the line 5—5 of Fig. 3; and Fig. 6 is a detailed sectional view on the line 6—6 of Fig. 4.

The embodiment of the invention shown for the purpose of illustration comprises a circular rotatable structure or turntable A to which articles to be inspected are brought by any suitable mechanism such as the conveyer belt B, passing over roller C between guide members D. Inspected articles are carried away by a similar conveyer E passing over a roller F. Surrounding the rotatable structure or turntable A is a plurality of inspectors' desks G. Each desk may be provided with a credit index H and a chair J for the inspector.

The turntable A as disclosed by the drawing is supported by a base 7 in which a pivot post 8 is fast. Pivot post 8 has an upper reduced portion 9 forming a shoulder at 10 and is further reduced at the top to form a stub end 11 and shoulder 12. Mounted for rotation upon the lower portion of post 8 is a sleeve 13, the lower end of which rests on ball bearings 14 on base 7. The upper portion of sleeve 13 has a reduced axial bore 15 receiving part 9 of the post and forming a shoulder which contacts with shoulder 10 on the post. Fast on the top of sleeve 13 is a collar 16 having integral radial projections 17 to which are fastened radial arms 18 and 19. These radial arms may comprise pairs of angle irons applied to opposite sides of projection 17 and bolted therethrough as shown in Figs. 4 and 6. Arms 18 are straight and horizontally disposed. Arms 19 have offset substantially parallel ends and are so fastened to projection 17 as to dispose the outer ends thereof in vertical spaced relation to the outer portions of radial arms 18.

Mounted on pivot pin or stub end 11 of post 8 is a flat conical cap piece 20 made integral with the lower portion of the turntable by means of inwardly inclined members 21 attached at one end to downwardly inclined radial arms 22 on member 20 and at the other end to radial arms 18.

The frame work of structure A just described is suitably covered with sheet material to provide two annular article receiving levels or shelves 23 and 24, the former being supported by arms 18 and the latter by arms 19. The sheet material covering the members 21 provides a substantially axially disposed frusto-conical deflecting or distributing surface 25 which merges at its base into the surface of level 23 and may be overlapped at the top if desired to form a smooth sliding surface by ring 26 which may be of yielding or resilient material set into a recess in cap piece 20. Upper level 23 has an upwardly projecting rim 27 to prevent articles thereon from sliding off.

Articles placed upon lower level 24 are retained therein by a circular stationary guard 28. The upper portion of the guard is cut down to the level or surface 24 adjacent conveyer belt E to permit articles on surface 24 to be deflected upon the conveyer, a plate 29 being provided to bridge the gap between guard 28 and the upper surface of roller 21. The means for directing articles on level 24 to conveyer E comprises a curved deflector 30 which is an extension of the guard member for the conveyer and curves across the surface of level 24 into juxtaposition to the wall 31 extending vertically between arms 18 and 19.

Any suitable means may be provided for rotating structure or turntable A, the means shown in the drawing comprising an electric motor 32 mounted upon base 7. The motor drives a shaft 33 supported at its free end in a bearing 34 and provided with a worm 35 which operates a worm gear 36 fast on the lower end of sleeve 13. To prevent tipping and rocking of the turntable, casters 37, shown in detail in Fig. 5, are provided at suitable intervals upon wall 31. These casters roll on a circular track 38.

The operation of the device is as follows: Articles are conveyed to turntable A by means of belt B and delivered upon cap piece 20, whence they slide by gravity down inclined surface 25 and come to rest on level 23 adjacent the desks G of the inspectors or examiners. As turntable A slowly rotates in the direction of arrow *a* (Fig. 2) the operators occupying chairs J remove the articles from level 23, examine them, referring to a credit file H if necessary to determine whether the customer's credit is sufficiently good to permit the article to go forward. If the examination is satisfactory, the inspector places the article upon lower level 24. When the article reaches a position opposite conveyer E, curved deflector 30 guides it upon the conveyer which carries it to the shipping or other department.

The particular arangement of elements shown has many advantages. When articles are coming through slowly a single inspector may be able to take care of them and the others may be released for other work. When the articles begin to come through in greater numbers other operators may be called. A considerable accumulation of articles is possible upon upper level 23 without permitting any of them to get by the inspector without examination, since if an article is not taken off the first time it stays upon level 23 by reason of retaining rim 27 until it is removed for inspection.

The slope of distributing or deflecting surface 25 may be made as sharp or as gradual as may be desirable for the particular class of articles to be inspected. If gradual, boxes containing loose articles may be sent through the device for checking, as in small shipments in mail order houses and in other establishments selling goods in small quantities. In cases of this kind the operators may pack and wrap the articles for shipment as well as check the contents before placing the package upon level 24.

I claim:

1. Conveyer apparatus comprising a plurality of carriers traveling past a plurality of operators' stations, means for automatically depositing articles upon one of said carriers, and means for automatically removing articles from another of said carriers, whereby articles may be delivered to and from any one of the operators' stations by the same carriers.

2. Conveyer apparatus comprising a plurality of annular carriers rotatable about a common axis past a plurality of operators' stations, means for automatically depositing articles upon one of said carriers, and means for automatically removing articles from another of said carriers, whereby articles may be delivered to and from any one of the operators' stations by the same carriers.

3. Conveyer apparatus comprising a plurality of annular carriers rotatable about a common axis past a plurality of operators' stations, a distributor having a distributing surface sloping upwardly and inwardly from one of said annular carriers, a conveyer for delivering articles upon said distributor to slide down said surface to different positions on the associated carrier depending upon the angular position of the carrier relative to said axis, and a second conveyer for delivering articles from another of said carriers.

4. Conveyer apparatus comprising a carrier rotatable past a plurality of operators' stations, said carrier having peripheral shelves at different levels, a conical distributor extending upwardly and inwardly from the upper shelf, a conveyer for delivering articles upon said distributor so as to be distributed around the upper shelf as the carrier rotates, and a conveyer for automatically delivering articles from another of said shelves, whereby articles may be delivered to and from any one of the operators' stations by the carriers.

5. In apparatus of the character described, a rotatable structure, a pair of article shelves at different levels thereon, means for supplying articles to one level and for removing articles from the other level, and a plurality of inspectors' stations grouped about said structure, whereby an operator at any one of said stations may remove articles from one shelf and then place the articles upon the other shelf.

6. In apparatus of the class described, a stationary post, a structure mounted upon said post for rotative movement, vertically spaced article receiving shelves on said structure, and a deflector extending above the upper of said shelves to direct articles to the outer edge thereof.

7. In apparatus of the class described, a stationary post, a structure mounted upon said post for rotative movement, said structure comprising a sleeve enclosing the lower portion of said post and a cap piece upon the top of said post, vertically spaced article receiving levels on said structure, and a deflector extending above the upper of said levels to direct articles to the outer edge thereof.

8. In apparatus of the class described, a stationary post, a sleeve surrounding the lower portion of said post, and a cap piece upon the top of said post, means connecting said sleeve and said cap piece to form a rotatable structure having vertically spaced carrier shelves integral therewith, and a frusto-conical deflecting surface extending between the upper of said shelves and said cap piece whereby articles are directed to the outer edge of the upper shelf.

9. In apparatus of the class described, a stationary post, a sleeve surrounding the lower portion of said post, a cap piece upon the top of said post, radial arms extending outwardly from said sleeve, vertically spaced annular carriers supported by said arms, and upwardly and inwardly inclined members connecting certain of said arms with said cap piece to provide a deflecting surface adapted to direct articles deposited upon said cap piece to the outer edge of one of said carriers.

10. In apparatus of the class described, a stationary post, a sleeve surrounding the lower portion of said post, a cap piece upon the top of said post, a series of radial arms extending horizontally outwardly from said sleeve, a second series of radial arms having offset substantially parallel ends also extending outwardly from said sleeve, vertically spaced annular carriers supported by said arms, and upwardly and inwardly inclined members connecting said first named arms with said cap piece to provide a deflecting surface adapted to direct articles deposited upon said cap piece to the outer edge of one of said carriers.

11. Conveyer apparatus comprising a turntable, means for rotating said turntable, annular article carriers mounted on said turntable at different levels, a conical distributor extending above the uppermost of said carriers, a circular guard for retaining articles upon the lowermost of said carriers, and means associated with said last named carrier for removing articles therefrom.

12. Conveyer apparatus comprising a turntable, means for rotating said turntable, annular article carriers mounted on said turntable at different levels, a conical distributor extending above the uppermost of said surfaces, a circular guard for retaining articles upon the lowermost of said surfaces, said guard having an opening therein, and means for directing articles on said last named surface through said opening.

13. In apparatus of the character described, a turntable, means for rotating said turntable, annular article carriers on said turntable, a conical distributor extending above the uppermost of said carriers, a conveyor for delivering articles upon said distributor, a second conveyer for carrying away articles deposited on the lowermost of said carriers, and means for directing articles on said lowermost carrier to said second conveyer.

Signed by me at Boston, Mass., this 10th day of January 1922.

JAMES H. RAND.